United States Patent [19]

Ang et al.

[11] 4,215,182
[45] Jul. 29, 1980

[54] CONVERSION OF SOLAR ENERGY TO CHEMICAL AND ELECTRICAL ENERGY

[75] Inventors: Peter G. P. Ang; Anthony F. Sammells, both of Naperville, Ill.

[73] Assignee: Institute of Gas Technology, Chicago, Ill.

[21] Appl. No.: 43,144

[22] Filed: May 29, 1979

[51] Int. Cl.² .................. H01M 8/18; H01M 6/30
[52] U.S. Cl. .......................... 429/15; 429/9; 429/17; 429/21; 429/111
[58] Field of Search .............. 429/19, 111, 9, 17, 429/21, 15

[56] References Cited

U.S. PATENT DOCUMENTS

| 4,117,202 | 9/1978 | Beck | 429/2 |
| 4,128,704 | 12/1978 | McKinzie et al. | 429/111 |

OTHER PUBLICATIONS

M. Calvin, "Solar Energy by Photosynthesis", *Science*, vol. 184, pp. 375-381, (1974).
M. Eisenberg et al., "Photo-Electrochemical Cells", *Electrochimica Acta*, vol. 5, pp. 1-12, (1961).
P. O'Donnell et al., "The Redox Flow System for Solar Photovoltaic Energy Storage", *Conf. Record, 12th IEEE Photovoltaic Specialists Conf.*, (1976), pp. 733-736.

*Primary Examiner*—Aaron Weisstuch
*Attorney, Agent, or Firm*—Thomas W. Speckman

[57] ABSTRACT

Apparatus and processes for conversion of solar energy to chemical and electrical energy using a photoelectrochemical membrane cell to regenerate the redox anolyte of a redox-oxygen cell.

43 Claims, 1 Drawing Figure

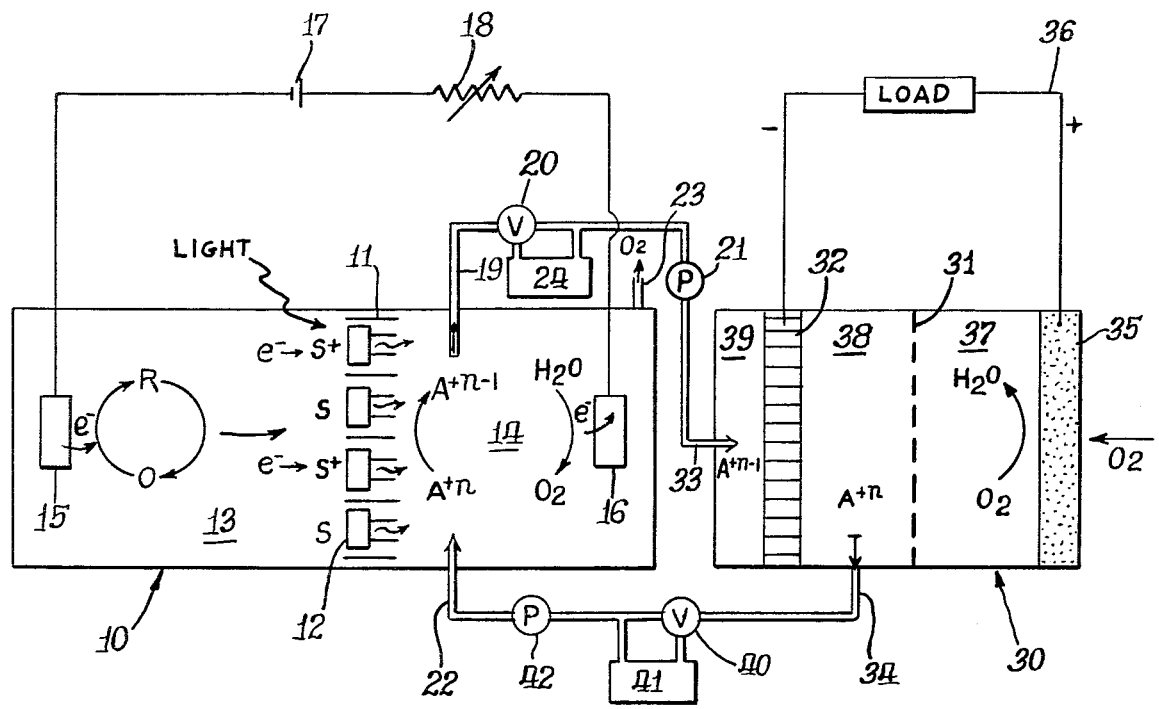

CONVERSION OF SOLAR ENERGY TO CHEMICAL AND ELECTRICAL ENERGY

BACKGROUND OF THE INVENTION

1. Field of the Invention

This invention relates to apparatus and processes for conversion of solar energy to chemical and electrical energy. Particularly, this invention provides for conversion of solar energy to electrical energy using a photoelectrochemical membrane cell to regenerate a redox anolyte of a redox-oxygen cell. An electron transferring membrane separates a first redox electrolyte comprising R/O couples from a redox aqueous anolyte comprising $A^{+n}/A^{+n-1}$ couples. Photosensitizers are located in the first redox electrolyte adjacent the electron transferring membrane and illumination of the photosensitizers produces excited sensitizers and electrons. The produced electrons are passed through the membrane oxidizing the sensitizers and reducing the redox anolyte, thereby producing chemical energy which, in the form of the reduced redox anolyte, may be stored for future energy utilization, including conversion to electrical energy. Particularly, the reduced redox aqueous anolyte may be converted to electrical energy in a redox-oxygen cell. The oxidized sensitizers may be regenerated by reduction in the first redox electrolyte and the first redox electrolyte regenerated electrochemically by contact with a negative electrode in communication through an external bias circuit with the redox aqueous anolyte.

2. Description of the Prior Art

The direct conversion of solar energy to electricity can be achieved by solid state photovoltaic cells, such as those using silicon solar arrays. While such direct conversion has been viable for specialized application, the costs have been too high for acceptance for general electrical generation utilization. Additionally, storage of electricity generated by the solid state photovoltaic cells has presented both technical and economic problems. The electricity storage has been generally performed by use of large storage batteries. Attempts are continuing to arrive at advanced battery systems which would provide technical and economic viability for such storage. Another method of conversion of solar energy to electrical energy in a single device is the photoelectrogenerative cell suggested by U.S. Pat. No. 4,037,029 wherein an electrolytic cell anolyte contains a photoelectrogenerative material.

The utilization of optical, or solar, energy to produce chemical energy has been recognized. For example, U.S. Pat. No. 4,094,751 teaches photoelectrolysis of water by utilization of photoactive photochemical diodes for decomposing water into $H_2$ and $O_2$. This patent teaches small photochemical diodes which are suspended in the bulk volume matrix of the chemical reactants and upon absorption of light, the diodes drive the desired chemical reaction within such matrix. However, the U.S. Pat. No. 4,094,751 does not teach utilization of photosensitizers in association with an electron transferring membrane to regenerate a redox anolyte and does not suggest regeneration of the sensitizers by utilization of an external bias circuit. U.S. Pat. No. 4,021,323 teaches the conversion of solar energy to electrical energy by using solid state photovoltaic generators to electrolyze an electrolyte thereby producing hydrogen for use in a fuel cell for production of electrical energy. The U.S. Pat. No. 4,021,323 does not suggest regeneration of a redox aqueous anolyte used in a redox-oxygen cell by utilization of photosensitizers in association with an electron transferring membrane.

In nature, the process of photosynthesis produces an oxidized species on one side and a reduced species on the other side of an energy transducing membrane in the chloroplast. Also, photo effects on chlorophyll containing bimolecular lipid membranes have been shown. (Tien, H. T., *J. Phys. Chem.* 72, 4512 [1968] and Tien, H. T. and Verma, S. P., *Nature* 227, 1232 [1970]) It is also known that artificial membranes doped with appropriate sensitizers and ionophores may generate photoelectric potential and current. (Tien, H. T. and Kobamoto, N., *Nature* 224, 1107 [1969]; Shieh, P. and Packer, L., *Biochem. Biophys. Res. Comm.*, 71, 603 [1976]; Ullrich, H. M. and Kuhn, H., *Biochim. Biophys. Acta* 266, 584 [1972] and Pant, H. C. and Rosenberg, B., *Photochem. Photobiol.* 14, 1 [1971]) However, due to the large internal resistance of the membrane and the smallness of the produced currents, their use as current generators has not been practical. The formation of a donor/acceptor complex with a membrane by a sensitizer is known (Pant, H. C., et al supra) and the influence of the electron transfer process on the membrane due to an electrochemical potential gradient has been demonstrated. (Pant, H. C., et al supra) The cited prior art does not suggest regeneration of photosensitizers in a redox electrolyte which is regenerated by an external bias circuit to a redox aqueous anolyte.

SUMMARY OF THE INVENTION

The present invention provides a process and an apparatus for converting solar energy to chemical energy utilizing a photoelectrochemical membrane cell. The photoelectrochemical membrane cell is divided into a first and second compartment by an electron transferring membrane which has in association with it photosensitizers on the first compartment side. In the first compartment is a first redox electrolyte having R/O couples and in the second compartment is a redox aqueous anolyte having $A^{+n}/A^{+n-1}$ couples. The first redox R/O couples have a redox potential more negative than the decomposition potential of the photosensitizers while the redox anolyte $A^{+n}/A^{+n-1}$ couples have a redox potential more positive than the excited state level of the sensitizers or the flat band potential of a semiconductor sensitizer. A negative electrode is in electronic communication with the first redox electrolyte and a positive electrode is in electronic communication with the redox aqueous anolyte. The electrodes are in electronic communication through an external bias circuit.

In operation, the photosensitizers may be illuminated with solar energy producing excited sensitizers. The initial excitation of the sensitizer by capture of photon energy may be expressed by the reaction $$S \xrightarrow{h\nu} S^* \qquad \text{I.}$$

wherein $S^*$ represents an excited sensitizer. The excitation of the sensitizer is quenched by electron transfer from the excited sensitizer to an acceptor couple in the redox aqueous anolyte where the electron transfer process is taking place across the membrane. This reaction may be expressed by the equation $$S^* \rightarrow S^+ + e^- \qquad \text{IIa.}$$

$$e^- + A^{+n} \rightarrow A^{+n-1} \qquad \text{IIb.}$$

Equation IIa results in an oxidized sensitizer while equation IIb results in a reduced acceptor couple.

The sensitizer may be regenerated electrochemically by current passing through the membrane, the current being provided by an external bias circuit. The sensitizer regeneration takes place in conjunction with the R/O couples in the redox electrolyte. Regeneration of the photosensitizer takes place in the membrane area according to the following equations:

$$R \rightarrow O + e^- \qquad \text{III.}$$

and results in the oxidized species O of the redox couple in the electrolyte while equation $$S^{*+} + e^- \rightarrow S \qquad \text{IV.}$$

results in regeneration of the photo sensitizer to the state S. The membrane absorbs or incorporates the photosensitizers providing stabilization for the sensitizers. The sensitizers are further stabilized against oxidation by the bias current. The oxidized redox electrolyte couple is electrochemically regenerated (reduced) at the surface of the electrode in contact with the redox electrolyte according to the equation $$O + e^- \rightarrow R \qquad \text{V.}$$

In the redox aqueous anolyte, the electron acceptor has been reduced according to equation IIb. Both the reduced acceptor $(A^{+n-1})$ and the active acceptor $(A^{+n})$ are soluble in the aqueous electrolyte. The reduced acceptor $(A^{+n-1})$ may be stored in its reduced form for subsequent use as chemical energy. Thus, the chemical energy can be physically stored without degradation.

According to one embodiment of this invention, the reduced acceptor may be used as a couple in a redox-oxygen cell anolyte for production of electrical energy. In the redox-oxygen cell, the reduced redox anolyte may be passed in contact with a porous flowthrough anode oxidizing it in accordance with the reaction $$\text{VI. } A^{+n-1} \rightarrow A^{+n} + e^- \qquad \text{VI.}$$

The oxidized redox aqueous anolyte couple $(A^{+n})$ may then be recycled to the photoelectrochemical membrane cell for reaction in reaction IIb.

At the oxygen diffusion cathode of the redox-oxygen cell, oxygen is introduced for reaction to produce water according to the reaction $$O_2 + 4H^+ + 4e^- \rightarrow 2H_2O \qquad \text{VII.}$$

The output voltage of the redox-oxygen cell is obtained by placing a load in electrical communication with the porous flowthrough anode and the oxygen diffusion cathode. The output voltage will depend upon the redox aqueous anolyte couples.

BRIEF DESCRIPTION OF THE DRAWING

The objects, advantages and features of this invention will be apparent from the description together with the drawing showing one preferred embodiment wherein:

The FIGURE is a schematic representation of a photoelectrochemical membrane cell in conjunction with a redox-oxygen cell for production of electrical energy according to one embodiment of this invention showing both electronic movement and chemical movement.

DESCRIPTION OF THE PREFERRED EMBODIMENTS

Referring to the figure, the photoelectrochemical membrane cell is shown as 10 with the cell container divided into two compartments by membrane 11. Membrane 11 has associated with it photosensitizers shown schematically as 12. The photosensitizers are on the surface of or within the electron transferring membrane. The first compartment 13 has a first redox electrolyte with R/O couples for coaction with negative electrode 15 and the photo sensitizers. The second compartment 14, on the opposite side of membrane 11 from compartment 13, has redox aqueous anolyte with $A^{+n}$/$A^{+n-1}$ couples. Negative electrode 15 is in electronic communication with the R/O couples in the first compartment and through an external bias circuit 17 with variable control 18 in electronic communication with bias circuit positive electrode 16 in the second compartment 14. The reactions as described above for equations I through V take place in photoelectrochemical membrane cell 10.

Suitable electron transferring membrane materials for use in the photoelectrochemical membrane cell according to this invention may be derived from biological materials or synthetic materials. The membrane must provide for charge transfer from one side to the other to maintain charge neutrality while maintaining separation of the different chemical species on each side of the membrane. Any membranes providing these properties are suitable for use in this invention. Suitable natural biological materials for making membranes include phospholipids, oxidized cholesterol and nitella protoplasm. Phospholipids useful in the membrane in the cell of this invention consist of a phosphate head group, glycerol, fatty acids and a nitrogeneous base. Fatty acids frequently used are oleic and palmitic, the nature of the fatty acid determining the hydrophobic character of the phospholipid. Suitable phospholipids include phosphatidyl choline, phosphatidyl ethanolamine, and phosphatidyl serine. Bilayer membranes from natural biological materials may also be used, such as cholesterol and/or phospholipids. Suitable synthetic materials for membranes include polyacetylene, millipore filter membrane, nitrocellulose, cellulose acetate, polytetrafluoroethylene, cation or anion exchange membrane, Nafion (a sulfonated perfluoropolyethylene sold by DuPont). One preferred synthetic membrane is polyacetylene, made up of long chains of CH units connected by alternating single and double bonds.

Suitable photosensitizers for use in this invention include those materials providing absorption in visible wavelengths, about 3200 to 25000 angstroms, by capture of photon energy resulting in electron transfer from the excited sensitizer. Suitable photosensitizers are stable in the redox electrolyte and provide a semiconducting property. Natural materials including chlorophyll and bacteriorhodopsin are suitable.

Synthetic materials having the above properties are also suitable including n-type semiconductors. Suitable n-type semiconductors include: $Fe_2O_3$, $ZnTe$, $WO_3$, $MoS_2$, $MoSe_2$, $TiO_2$, $MTiO_3$, where M is a transition metal element or rare-earth metal element, $TiO_2$ heavily doped with compensated donor-acceptor pairs such as $Ni^{2+}$—$Sb^{5+}$, $Co^{2+}$—$Sb^{5+}$, etc., Si, Te, SiC, CdS, CdSe, CdTe, ZnSe, GaP, GaAs, InP, AlAs, AlSb, GaSb, $Cd_{1-x}Zn_xS$, $GaAs_xP_{1-x}$, $GaIn_{1-x}As$, $Al_xGa_{1-x}As$, Chalcopyrites, $Cu_2O$, $CuInS_2$, $AgInSe_2$, $AgInS_2$, $CuInSe_2$, $ZnSiP_2$, $CdSiP_2$, $CdSnP_2$, $CdSnAs_2$ and polyacetylene. The above chemicals must be appropriately doped with at least one n-type material, as is known to the art, for production of the n-type semiconductor. GaAs, CdSe, $MoS_2$, polyacetylene, $MoSe_2$ and $Fe_2O_3$ appropriately doped to make them n-type semiconducting materials are preferred and $MoS_2$ and $MoSe_2$ are especially preferred as the n-type semiconductor sensitizers for use in this invention. Especially preferred are n-type semiconductors with low band-gap energies, preferably Si or GaAs. Use of low band-gap semiconductors has previously been hindered since they tend to decompose because of self-oxidation. In the photoelectrochemical membrane cell of this invention, the self-oxidation of the semiconductor is reduced by the adjacent redox couple having oxidation potentials more negative than the semiconductor decomposition potential. It is desired that the n-type semiconductor material have band gaps in the order of about 1 to about 2.5 eV to provide increased solar energy conversion efficiencies. Recent recognition that the excitation of electrons within the space charge layer can result in effective bond breakage in the semiconductor can be eliminated by using semiconductor materials in which the electron excitation process involves electrons in non-bonding orbitals. Such preferred materials include $MoS_2$ and $MoSe_2$. Both monocrystalline and polycrystalline semiconductor materials may be used in this invention, as compared with the necessity for use of predominately single crystal semiconductor materials for good performance in solid state photovoltaic cells. Stability of the n-type semiconductor, with respect to the electrolyte in contact with it, may be increased by introduction of a deposited transparent wide band-gap material to form a heterostructure.

Suitable synthetic photosensitizers include eosin Y, merocyanine 540, rose bengal, rhodamine B, phthalocyanine and metal (Ni, Co, Cu) phthalocyanine, [Ru (bipy)(bipy)$_2$] $(ClO_4)_2$ with long chain organic constituents, $[Rh_2(1,3\text{-diisocyanopropane})_4Cl_2]^{2+}$. Preferred photosensitizers of this group include [Ru (bipy)(bipy)$_2$] $(ClO_4)_2$ and including long chain constituents from bipyridyl ligand.

The bias circuit electrodes may be any electroactive metal providing electron passage between the electrolyte and the bias circuit and which is stable in the electrolyte. Preferred are porous metal electrodes produced by methods known to the art and preferred metals include carbon, platinum, palladium, titanium, Raney catalyst metals, and alloys thereof. Especially preferred is platinum.

Suitable electrolytes for use in the photoelectrochemical membrane cell of this invention are aqueous liquids for transport of the redox couples. The aqueous electrolytes may be acid or alkaline.

The redox electrolyte on the same side of the electron transferring membrane as the photosensitizers has redox electrolyte couples, signified by R/O, which have a redox potential more negative than the decomposition potential of the sensitizers. The redox electrolyte R/O couples are electron donor couples and include $Cu^+/Cu^{+2}$, $Sn^{+2}/Sn^{+4}$, $Ti^{+3}/Ti^{+4}$, $Fe^{+2}/Fe^{+3}$, $Sb^{+3}/Sb^{+5}$, $Br^-/Br_2$, $I^-/I_2$, $S^{-2}/S_n^{-2}$, $Se^{-2}/Se_2^{-2}$, $H_2O/O_2$, $C_6H_4(OH)_2/C_6H_4O_2$, $Fe(CN)_6^{-4}/Fe(CN)_6^{-3}$, $BrC_6H_3(OH)_2/BrC_6H_3O_2$, $Te^{-2}/Te_2^{-2}$ and $Ce^{+3}/Ce^{+4}$. Preferred electron donor couples include $Ti^{+3}/Ti^{+4}$, $I^-/I_2$, $C_6H_4(OH)_2/C_6H_4O_2$, and $BrC_6H_3(OH)_2/BrC_6H_3O_2$.

The redox aqueous anolyte on the other side of the electron transferring membrane from the photosensitizers has redox electrolyte couples, signified by $A^{+n}/A^{+n-1}$, which has a redox potential more positive than the excited state level of the sensitizers or the flat band potential of a semiconductor sensitizer. The redox anolyte $A^{+n}/A^{+n-1}$ couple is an electron acceptor couple and includes $H^+/H_2$, $Cr^{+2}/Cr^{+3}$, $Ti^{+2}/Ti^{+3}$, $Cu^+/Cu^{+2}$, $Sn^{+2}/Sn^{+4}$, $Te^{-2}/Te_2^{-2}$ and $I^-/I_2$. Preferred electron acceptor couples include $Cr^{+2}/Cr^{+3}$.

Preferred basic materials for use in the aqueous basic redox electrolyte and redox anolyte include KOH, NaOH and $NH_4OH$. Preferred alkaline electrolytes include donor couples $Br^-/Br_2$, $I^-/I_2$, $S^{-2}/S_n^{-2}$, $Se^{-2}/Se_2^{-2}$, $C_6H_4(OH)_2/C_6H_4O_2$, $BrC_6H_3(OH)_2/BrC_6H_3O_2$, $Fe(CN)_6^{-4}/Fe(CN)_6^{-3}$, and acceptor couples $Te^{-2}/Te_2^{-2}$ and $I^-/I_2$.

Preferred acidic materials for use in the aqueous acid redox electrolyte and redox anolyte include $H_2SO_4$, HCl, $H_3PO_4$, and $C_2H_4O_2$. Preferred aqueous acid electrolytes include donor couples $Cu^+/Cu^{+2}$, $Sn^{+2}/Sn^{+4}$, $Ti^{+3}/Ti^{+4}$, $Fe^{+2}/Fe^{+3}$, $Sb^{+3}/Sb^{+5}$, $Br^-/Br_2$, $I^-/I_2$, $C_6H_4(OH)_2/C_6H_4O_2$, $Fe(CN)_6^{-4}/Fe(CN)_6^{-3}$, and acceptor couples $Cr^{+2}/Cr^{+3}$, $Ti^{+2}/Ti^{+3}$, $Cu^+/Cu^{+2}$ and $Sn^{+2}/Sn^{+4}$.

The external bias circuit may provide from 0 to 200 mV with direct current, alternating current or pulsed wave forms. Especially preferred is an external bias current of about 80 to 150 mV.

Photoelectrochemical membrane cell 10 has gas vent 23 for venting the oxygen produced at bias circuit positive electrode 16. Reduced anolyte withdrawal conduit 19 is provided to withdraw reduced redox aqueous anolyte from photoelectrochemical membrane cell 10. Reduced anolyte withdrawal conduit 19 leads to valve 20 providing direction of reduced anolyte to anolyte storage vessel 24 or through pump 21 and reduced anolyte supply conduit 33 to redox-oxygen cell 30. Reduced anolyte storage vessel 24 may be of any suitable size and construction to store reduced redox aqueous anolyte for later utilization of its chemical energy. This provides long term stable storage of solar derived energy in chemical form. Reduced redox aqueous anolyte may be withdrawn from anolyte storage vessel 24 by reduced anolyte circulation pump 21. Likewise, oxidized anolyte may be supplied to photoelectrochemical membrane cell 10 by oxidized anolyte supply conduit 22. Oxidized anolyte may be recycled directly from redox-oxygen cell 30, or may be stored in oxidized anolyte storage vessel 40. Oxidized anolyte circulation pump 42 provides either direct recycle or withdrawal of oxidized anolyte from storage vessel 40.

Redox-oxygen cell 30 is an electrochemical cell for production of electrical energy according to methods known in the art. Any suitable redox-oxygen cell may be used which provides oxidation of the redox anolyte couple from $A^{+n-1}$ to $A^{+n}$ while also providing make up water for the aqueous anolyte. The reduced anolyte is supplied by reduced anolyte supply conduit 33 to reduced anolyte compartment 39 and then passes in contact through porous flow-through anode 32 to oxidized anolyte compartment 38. Oxidized anolyte compartment 38 is separated by ion transferring separator 31 from catholyte compartment 37 which is in communication with oxygen diffusion cathode 35. Suitable oxygen diffusion cathodes are known to the art, such as catalyst containing Teflon-bonded air diffusion cathodes. Cell separator 31 is provided to afford ionic interaction between the two electrolytes for completion of the electrical circuit. Suitable separator materials are well known in the art and include nitrocellulose, cellulose acetate, Nafion (a sulfonated perfluoropolyethylene sold by DuPont), and other fluorocarbon ion exchange membranes. Different configurations and components of redox-oxygen cells are suitable for use in this invention as long as they provide chemical separation of the two electrolytes and the desired oxidation of anolyte couple as it passes through the flowthrough electrode. Electricity may be withdrawn from the redox-oxygen cell by external load circuit 36 coupled with appropriate other external circuits known to the art (not shown in the figure).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for conversion of solar energy to electrical energy by using a photoelectrochemical membrane cell to regenerate a redox anolyte of a redox-oxygen cell for production of electrical energy comprising in combination:

A. in a photoelectrochemical membrane cell;

illuminating photosensitizers with solar energy thereby producing excited sensitizers and electrons, said sensitizers being located in a redox electrolyte comprising R/O couples adjacent an electron transferring membrane separating said redox electrolyte from a redox aqueous anolyte comprising $A^{+n}/A^{+n-1}$ couples, said redox electrolyte couples having a redox potential more negative than the decomposition potential of said sensitizers and said redox anolyte couples having redox potential more positive than the excited state level of the sensitizers or the flat-band potential of a semiconductor sensitizer, passing said electrons through said membrane oxidizing said sensitizers and reducing said redox anolyte couples, regenerating the oxidized sensitizers by reduction in said redox electrolyte producing oxidized redox electrolyte couples, electrochemically regenerating oxidized redox electrolyte couples at the surface of a negative electrode in electronic communication with said redox electrolyte and in electronic communication through an external bias circuit with a positive electrode in electronic communication with said redox aqueous anolyte, and venting oxygen produced at said positive electrode, B. passing said reduced redox aqueous anolyte couples to a redox-oxygen cell;

C. in said redox-oxygen cell;

passing said reduced redox anolyte couples in contact with a porous flowthrough anode thereby oxidizing said couples to a condition suitable for recycle to said photoelectrochemical membrane cell as electron acceptor redox anolyte couples, passing oxygen through a diffusion cathode to a catholyte of said redox-oxygen cell to form water, withdrawing electrical energy from said redox-oxygen cell by an external load circuit in electronic communication between said porous anode and said diffusion cathode, an ionically conductive separator between the redox-oxygen cell catholyte and anolyte completing the circuit; and D. recycling said oxidized redox anolyte couples to the anolyte side of said photoelectrochemical membrane cell.

2. The process of claim 1 wherein said electron transferring membrane is derived from natural biological materials.

3. The process of claim 1 wherein said electron transferring membrane is synthetic material.

4. The process of claim 1 wherein said photosensitizers are n-type semiconductors.

5. The process of claim 4 wherein said n-type semiconductors are selected from the group consisting of GaAs, CdSe, $MoS_2$, $Fe_2O_3$ and polyacetylene.

6. The process of claim 1 wherein said photosensitizers are selected from the group consisting of eosin Y, merocyanine 540, rose bengal, rhodamine B, phthalocyanine and nickel, copper, or cobalt phthalocyanine, [Ru(bipy)(bipy)$_2$] (ClO$_4$)$_2$ with long chain organic constituents, and [Rh$_2$(1,3-diisocyanopropane)$_4$Cl$_2$]$^{2+}$.

7. The process of claim 1 wherein said R/O couples are selected from the group consisting of $Ti^{+3}/Ti^{+4}$, $I^-/I_2$, $C_6H_4(OH)_2/C_6H_4O_2$, and $BrC_6H_3(OH)_2/BrC_6H_3O_2$.

8. The process of claim 1 wherein said $A^{+n}/A^{+n-1}$ couples are selected from the group consisting of $H^+/H_2$, $Cr^{+2}/Cr^{+3}$, $Ti^{+2}/Ti^{+3}$, $Cu^+/Cu^{+2}$, $Sn^{+2}/Sn^{+4}$, $Te^{-2}/Te_2^{-2}$ and $I^-/I_2$.

9. The process of claim 1 wherein said redox electrolyte and said redox anolyte is an aqueous basic electrolyte selected from the group consisting of KOH, NaOH and NH$_4$OH.

10. The process of claim 1 wherein said redox electrolyte and said redox anolyte is an aqueous acid electrolyte selected from the group consisting of $H_2SO_4$, HCl, $H_3PO_4$ and $C_2H_4O_2$.

11. The process of claim 1 wherein an external bias voltage of about 80 mV to about 150 mV is provided.

12. In a process for conversion of solar energy to electrical energy by using a photoelectrochemical membrane cell to regenerate a redox anolyte of a redox-oxygen cell for production of electrical energy, the steps comprising:

illuminating photosensitizers with solar energy thereby producing excited sensitizers and electrons, said sensitizers being located in a redox electrolyte comprising R/O couples on or within an electron transferring membrane separating said redox electrolyte from a redox aqueous anolyte comprising $A^{+n}/A^{+n-1}$ couples, said redox electrolyte couples having a redox potential more negative than the decomposition potential of said sensitizers and said redox anolyte couples having redox potential more positive than the excited state level of the sensitizers or the flat-band potential of a semiconductor sensitizer;

passing said electrons through said membrane thereby oxidizing said sensitizers and reducing said redox anolyte couples;

regenerating the oxidized sensitizers by reduction in said redox electrolyte thereby producing oxidized redox electrolyte couples; and electrochemically regenerating oxidized redox electrolyte couples at the surface of a negative electrode in electronic communication with said redox electrolyte and in electronic communication through an external bias circuit with a positive electrode in electronic communication with said redox aqueous anolyte, and venting oxygen produced at said positive electrode.

13. The process of claim 12 wherein said electron transferring membrane is derived from natural biological materials.

14. The process of claim 12 wherein said electron transferring membrane is synthetic material.

15. The process of claim 12 wherein said photosensitizers are n-type semiconductors.

16. The process of claim 15 wherein said n-type semiconductors are selected from the group consisting of GaAs, CdSe, $MoS_2$, $Fe_2O_3$ and polyacetylene.

17. The process of claim 12 wherein said photosensitizers are selected from the group consisting of eosin Y, merocyanine 540, rose bengal, rhodamine B, phthalocyanine and nickel, copper or cobalt phthalocyanine, [Ru(bipy)(bipy)$_2$] (ClO$_4$)$_2$ with long chain organic constituents, and [Rh$_2$(1,3-diisocyanopropane)$_4$Cl$_2$]$^{2+}$.

18. The process of claim 12 wherein said R/O couples are selected from the group consisting of $Ti^{+3}/Ti^{+4}$, $I^-/I_2$, $C_6H_4(OH)_2/C_6H_4O_2$, and $BrC_6H_3(OH)_2/BrC_6H_3O_2$.

19. The process of claim 12 wherein said $A^{+n}/A^{+n-1}$ couples are selected from the group consisting of $H^+/H_2$, $Cr^{+2}/Cr^{+3}$, $Ti^{+2}/Ti^{+3}$, $Cu^+/Cu^{+2}$, $Sn^{+2}/Sn^{+4}$, $Te^{-2}/Te_2^{-2}$ and $I^-/I_2$.

20. The process of claim 12 wherein said redox electrolyte and said redox anolyte is an aqueous basic electrolyte selected from the group consisting of KOH, NaOH and NH$_4$OH.

21. The process of claim 12 wherein said redox electrolyte and said redox anolyte is an aqueous acid electrolyte selected from the group consisting of H$_2$SO$_4$, HCl, H$_3$PO$_4$ and C$_2$H$_4$O$_2$.

22. The process of claim 12 wherein an external bias voltage of about 80 mV to about 150 mV is provided.

23. A process for converting solar energy to chemical energy using a photoelectrochemical membrane cell comprising the steps of:

illuminating photosensitizers with solar energy thereby producing excited sensitizers and electrons, said sensitizers being located in a redox electrolyte comprising R/O couples adjacent an electron transferring membrane separating said redox electrolyte from a redox aqueous anolyte comprising $A^{+n}/A^{+n-1}$ couples, said redox electrolyte couples having a redox potential more negative than the decomposition potential of said sensitizers and said redox anolyte couples having redox potential more positive than the excited state level of the sensitizers or the flat-band potential of a semiconductor sensitizer;

passing said electrons through said membrane thereby oxidizing said sensitizers and reducing said redox anolyte couples;

regenerating the oxidized sensitizers by reduction in said redox electrolyte thereby producing oxidized redox elctrolyte couples;

electrochemically regenerating oxidized redox electrolyte couples at the surface of a negative electrode in electronic communication with said redox electrolyte and in electronic communication through an external bias circuit with a positive electrode in electronic communication with said redox aqueous anolyte, and venting oxygen produced at said positive electrode; and removing said reduced redox aqueous anolyte couples from said membrane cell for energy utilization.

24. The process of claim 23 wherein said electron transferring membrane is derived from natural biological materials.

25. The process of claim 23 wherein said electron transferring membrane is synthetic material.

26. The process of claim 23 wherein said photosensitizers are n-type semiconductors.

27. The process of claim 26 wherein said n-type semiconductors are selected from the group consisting of GaAs, CdSe, $MoS_2$, $Fe_2O_3$ and polyacetylene.

28. The process of claim 23 wherein said photosensitizers are selected from the group consisting of eosin Y, merocyanine 540, rose bengal, rhodamine B, phthalocyanine and nickel copper or cobalt phthalocyanine, [Ru(bipy)(bipy)$_2$] (ClO$_4$)$_2$ with long chain organic constituents, and [Rh$_2$(1,3-diisocyanopropane)$_4$Cl$_2$[$^{2+}$.

29. The process of claim 23 wherein said R/O couples are selected from the group consisting of $Ti^{+3}/Ti^{+4}$, $I^-/I_2$, $C_6H_4(OH)_2/C_6H_4O_2$, and $BrC_6H_3(OH)_2/BrC_6H_3O_2$.

30. The process of claim 23 wherein said $A^{+n}/A^{+n-1}$ couples are selected from the group consisting of $H^+/H_2$, $Cr^{+2}/Cr^{+3}$, $Ti^{+2}/Ti^{+3}$, $Cu^+/Cu^{+2}$, $Sn^{+2}/Sn^{+4}$, $Te^{-2}/Te_2^{-2}$ and $I^-/I_2$.

31. The process of claim 23 wherein said redox electrolyte and said redox anolyte is an aqueous basic electrolyte selected from the group consisting of KOH, NaOH and NH$_4$OH.

32. The process of claim 23 wherein said redox electrolyte and said redox anolyte is an aqueous acid electrolyte selected from the group consisting of H$_2$SO$_4$, HCl, H$_3$PO$_4$ and C$_2$H$_4$O$_2$.

33. The process of claim 23 wherein an external bias voltage of about 80 mV to about 150 mV is provided.

34. A photoelectrochemical membrane cell comprising:

a cell container divided into a first and second compartment by an electron transferring membrane comprising photosensitizers on said first compartment side;

a redox electrolyte comprising R/O couples in said first compartment and a redox aqueous anolyte comprising $A^{+n}/A^{+n-1}$ couples in said second compartment, said redox electrolyte couples having a redox potential more negative than the decomposition potential of said sensitizers and said redox anolyte couples having a redox potential more positive than the excited state level of the sensitizers or the flat-band potential of a semiconductor sensitizer;

a negative electrode in electronic communication with said redox electrolyte and in electronic communication through an external bias circuit with a positive electrode in electronic communication with said redox aqueous anolyte.

35. The photoelectrochemical cell of claim 34 wherein said electron transferring membrane is derived from natural biological materials.

36. The photoelectrochemical cell of claim 34 wherein said electron transferring membrane is synthetic material.

37. The photoelectrochemical cell of claim 34 wherein said photosensitizers are n-type semiconductors.

38. The photoelectrochemical cell of claim 37 wherein said n-type semiconductors are selected from the group consisting of GaAs, CdSe, $MoS_2$, $Fe_2O_3$ and polyacetylene.

39. The photoelectrochemical cell of claim 34 wherein said photosensitizers are selected from the group consisting of eosin Y, merocyanine 540, rose bengal, rhodamine B, phthalocyanine and nickel, copper or cobalt phthalocyanine, [Ru (bipy)(bipy)$_2$] (ClO$_4$)$_2$ with long chain organic constituents, and [Rh$_2$(1,3-diisocyanopropane)$_4$Cl$_2$]$^{2+}$.

40. The photoelectrochemical cell of claim 34 wherein said R/O couples are selected from the group consisting of $Ti^{+3}/Ti^{+4}$, $I^-/I_2$, $C_6H_4(OH)_2/C_6H_4O_2$, and $BrC_6H_3(OH)_2/BrC_6H_3O_2$.

41. The photoelectrochemical cell of claim 34 wherein said $A^{+n}/A^{+n-1}$ couples are selected from the group consisting of $H^+/H_2$, $Cr^{+2}/Cr^{+3}$, $Ti^{+2}/Ti^{+3}$, $Cu^+/Cu^{+2}$, $Sn^{+2}/Sn^{+4}$, $Te^{-2}/Te_2^{-2}$ and $I^-/I_2$.

42. The photoelectrochemical cell of claim 34 wherein said redox electrolyte and said redox anolyte is an aqueous basic electrolyte selected from the group consisting of KOH, NaOH, and NH$_4$OH.

43. The photoelectrochemical cell of claim 34 wherein said redox electrolyte and said redox anolyte is an aqueous acid electrolyte selected from the group consisting of $H_2SO_4$, HCl, $H_3PO_4$ and $C_2H_4O_2$.

* * * * *